(12) United States Patent
Kim

(10) Patent No.: US 12,139,207 B2
(45) Date of Patent: Nov. 12, 2024

(54) STEERING REACTION FORCE GENERATION DEVICE FOR VEHICLE

(71) Applicant: HYUNDAI MOBIS CO., LTD., Seoul (KR)

(72) Inventor: Il Ryong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 265 days.

(21) Appl. No.: 17/659,095

(22) Filed: Apr. 13, 2022

(65) Prior Publication Data

US 2022/0388566 A1 Dec. 8, 2022

(30) Foreign Application Priority Data

Jun. 8, 2021 (KR) .................. 10-2021-0074455

(51) Int. Cl.
*B62D 5/00* (2006.01)
*B62D 5/04* (2006.01)
(52) U.S. Cl.
CPC ........... *B62D 5/006* (2013.01); *B62D 5/0415* (2013.01)

(58) Field of Classification Search
CPC .............................. B62D 5/006; B62D 5/0415
USPC ................................................... 180/443, 197
See application file for complete search history.

(56) References Cited

U.S. PATENT DOCUMENTS

2003/0116376 A1\* 6/2003 Uryu .................... B62D 5/0415
180/446

FOREIGN PATENT DOCUMENTS

KR 10-2008-0016945 2/2008

\* cited by examiner

*Primary Examiner* — Minnah L Seoh
*Assistant Examiner* — Felicia L. Brittman-Alabi
(74) *Attorney, Agent, or Firm* — DLA Piper LLP US

(57) ABSTRACT

A steering reaction force generation device for a vehicle may include a housing; a transfer shaft part rotatably installed in the housing, and disposed coaxially with a steering shaft; a stator part fixed to the inside of the housing; a rotor part connected to the transfer shaft part, and configured to rotate the transfer shaft part through an electromagnetic interaction with the stator part; and a power transfer part installed in the rotor part, and configured to transfer a rotational force of the transfer shaft part to the steering shaft.

15 Claims, 5 Drawing Sheets

STEERING REACTION FORCE GENERATION DEVICE FOR VEHICLE

CROSS-REFERENCE TO RELATED APPLICATION

This application claims priority from and the benefit of Korean Patent Application No. 10-2021-0074455, filed on Jun. 8, 2021, which is hereby incorporated by reference for all purposes as if set forth herein.

BACKGROUND

Field

Exemplary embodiments of the present disclosure relate to a steering reaction force generation device for a vehicle, and more particularly, to a steering reaction force generation device for a vehicle, which is applied to an SBW (Steer By Wire) system.

Discussion of the Background

In general, a vehicle uses a power-assisted steering system as means for guaranteeing the stability of a steering state by reducing the steering force of a steering wheel.

The SBW system refers to a steering system for removing mechanical connection between a steering wheel and a driving wheel of a vehicle. The SBW system may receive a rotation signal of the steering wheel through an ECU (Electronic Control Unit), and steer the vehicle by operating a steering motor connected to the driving wheel on the basis of the received rotation signal. Since the SBW system excludes a mechanical connection structure of an existing steering system, the SBW system can increase the degree of freedom in layout according to the configuration of a steering system, improve fuel efficiency, and remove disturbance which is reversely inputted from a driving wheel. Since the SBW system has no mechanical connection structure, the SBW system generates a steering reaction force or restoring reaction force through a steering reaction force generation device using a motor or the like.

The conventional steering reaction force generation device includes a reducer and a motor. When the steering reaction force generation device has a structure in which the reducer is stacked coaxially with the motor, the whole length of the steering reaction force generation device is increased, and the reducer and the motor need to be separately provided. Thus, the number of parts is increased. Therefore, the cost competitiveness of the steering reaction force generation device is undermined in comparison to other structures, and the effect for package design, which is an advantage of the coaxial structure, is degraded by the increased whole length.

The related art of the present disclosure is disclosed in Korean Patent Application Publication No. 10-2008-0016945 published on Feb. 22, 2008 and entitled "Electric Power Steering Device."

SUMMARY

Various embodiments are directed to a steering reaction force generation device for a vehicle, which can reduce the whole length and the number of parts.

In an embodiment, a steering reaction force generation device for a vehicle may include: a housing; a transfer shaft part rotatably installed in the housing, and disposed coaxially with a steering shaft; a stator part fixed to the inside of the housing; a rotor part connected to the transfer shaft part, and configured to rotate the transfer shaft part through an electromagnetic interaction with the stator part; and a power transfer part installed in the rotor part, and configured to transfer a rotational force of the transfer shaft part to the steering shaft.

The rotor part may include: a rotor core having an outer circumferential surface facing an inner circumferential surface of the stator part; a seating part fixed to an inner circumferential surface of the rotor core, and having the power transfer part housed therein; and a connection part extended from the seating part, and connected to the transfer shaft part.

The seating part may have an outer circumferential surface press-fitted onto the inner circumferential surface of the rotor core.

The seating part may be coupled to the rotor core through bolting.

The connection part may have an inner circumferential surface press-fitted onto an outer circumferential surface of the transfer shaft part.

The connection part has an inner circumferential surface connected to an outer circumferential surface of the transfer shaft part through spline teeth.

The rotor part may further include a stress distribution part provided between the seating part and the connection part and configured to distribute stress applied to the rotor part.

The stress distribution part may be extended from the seating part toward the connection part while inclined at a predetermined angle.

The power transfer part may include: a sun gear part extended from the transfer shaft part, and disposed in the seating part; a ring gear part fixed to the inside of the housing, and spaced apart from the sun gear part; a plurality of planetary gear parts provided between the sun gear part and the ring gear part, and configured to rotate and revolve in connection with a rotational force of the sun gear part; and a carrier part connected to the steering shaft, and rotated in connection with the revolutions of the plurality of planetary gear parts.

The ring gear part may include: a ring gear disposed coaxially with the sun gear part, and having an inner circumferential surface engaged with the plurality of planetary gear parts; and a fixed part extended from the ring gear, and detachably fixed to a cover part for opening/closing the housing.

The ring gear may be disposed so that an outer surface thereof is spaced apart by a predetermined distance from an inner surface of the seating part while facing the inner surface of the seating part.

The fixed part may be extended from a top of the ring gear in a radial direction of the ring gear, and has a top surface brought into contact with a bottom surface of the cover part.

In the steering reaction force generation device for a vehicle in accordance with the embodiment of the present disclosure, the power transfer part for transferring a rotational force of the transfer shaft part to the steering shaft may be housed in the seating part installed in the housing, which makes it possible to reduce the whole length, and to secure the cost competitiveness by reducing the number of parts and the weight.

DETAILED DESCRIPTION OF THE ILLUSTRATED EMBODIMENTS

Figure 1:
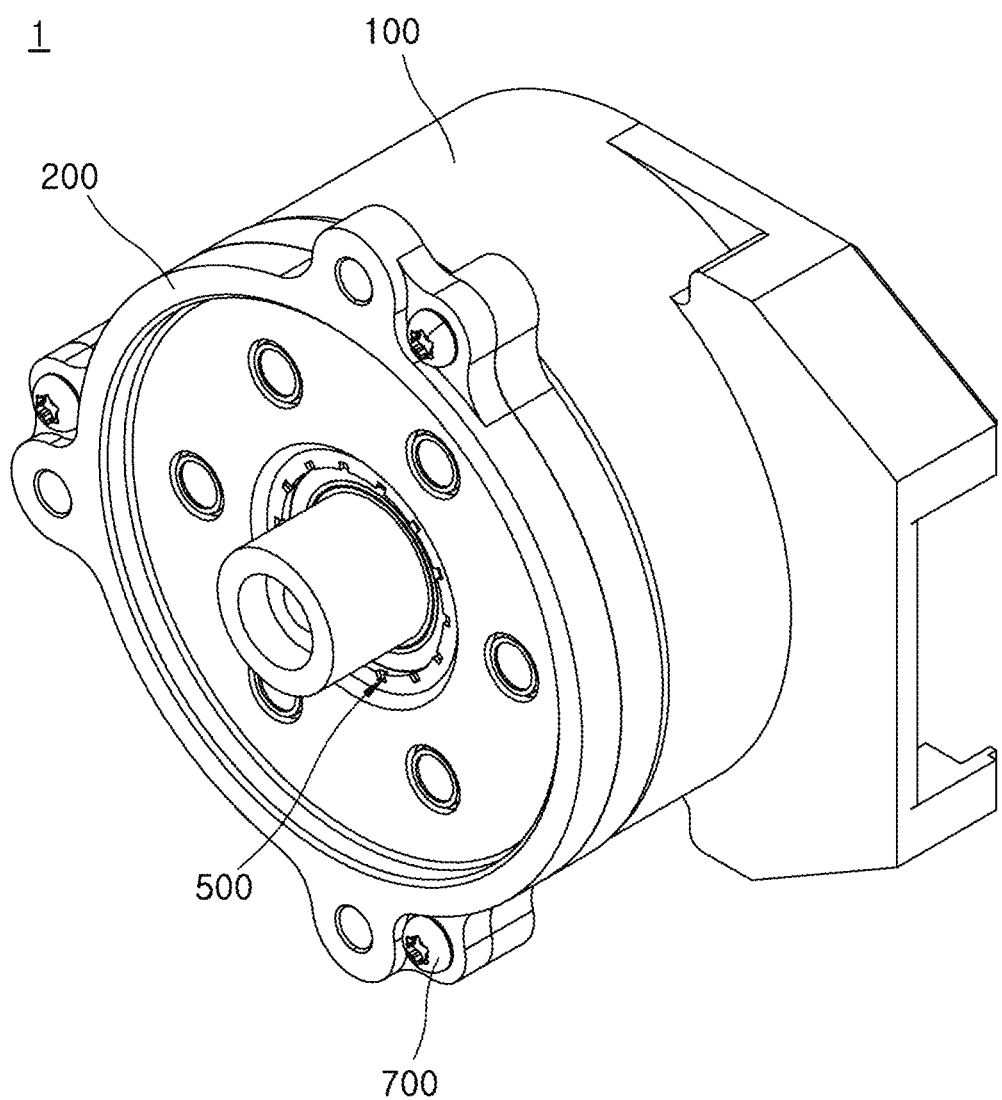
FIG. 1 is a perspective view schematically illustrating the configuration of a steering reaction force generation device for a vehicle in accordance with an embodiment of the present disclosure.

Hereinafter, a steering reaction force generation device for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" the another element or the one element is "indirectly connected or coupled to" the another element with still another element interposed therebetween. In this specification, when an element "includes or has" a component, it may indicate that the element does not exclude another component, but can further include or have another component, unless referred to the contrary.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of sub components included in the drawings of this application and the relative difference between sizes are set for convenience of description, and may not limit embodiments but may be set to various values.

Figure 2:
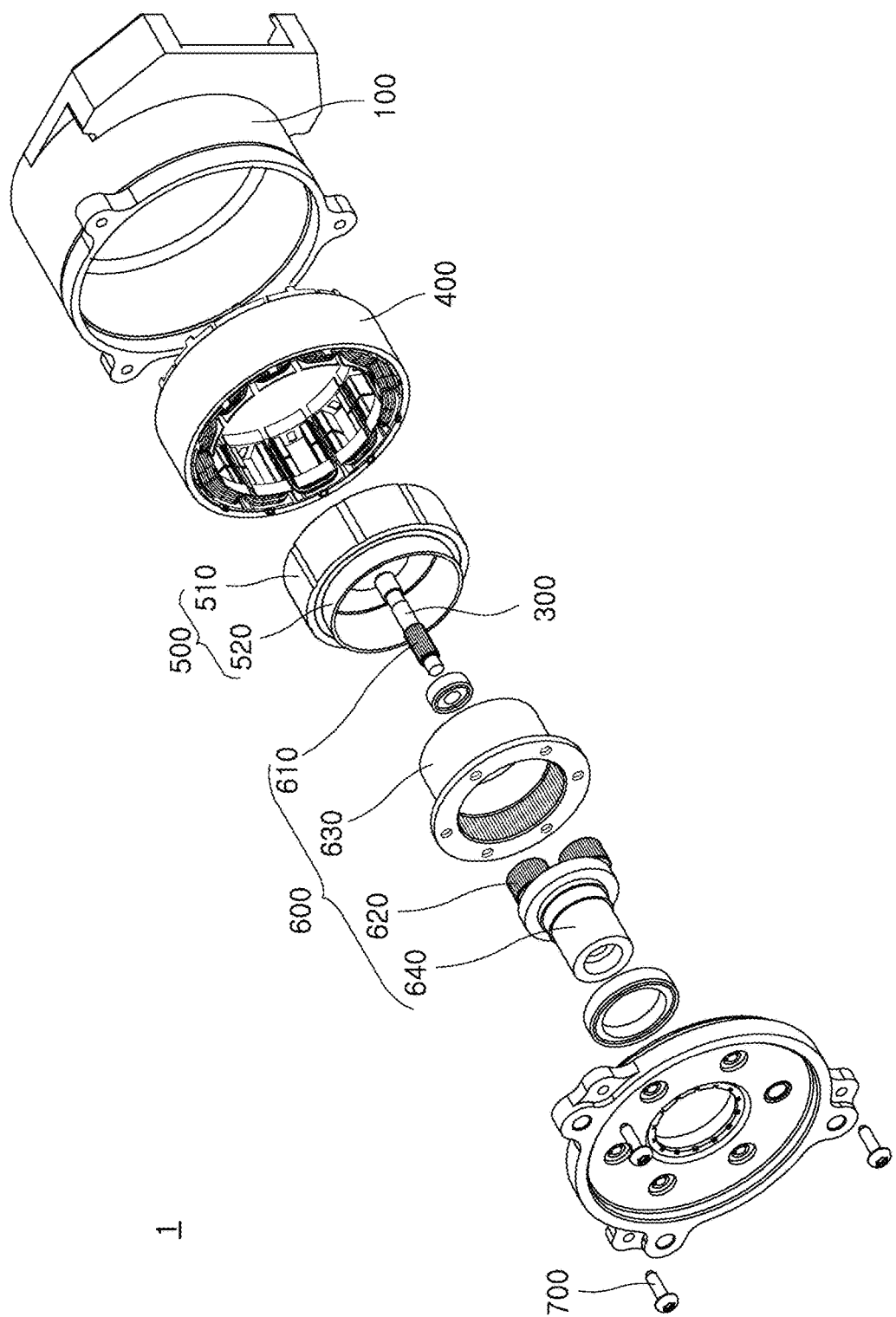
FIG. 2 is an exploded perspective view schematically illustrating the configuration of the steering reaction force generation device for a vehicle in accordance with the embodiment of the present disclosure.
Figure 3:
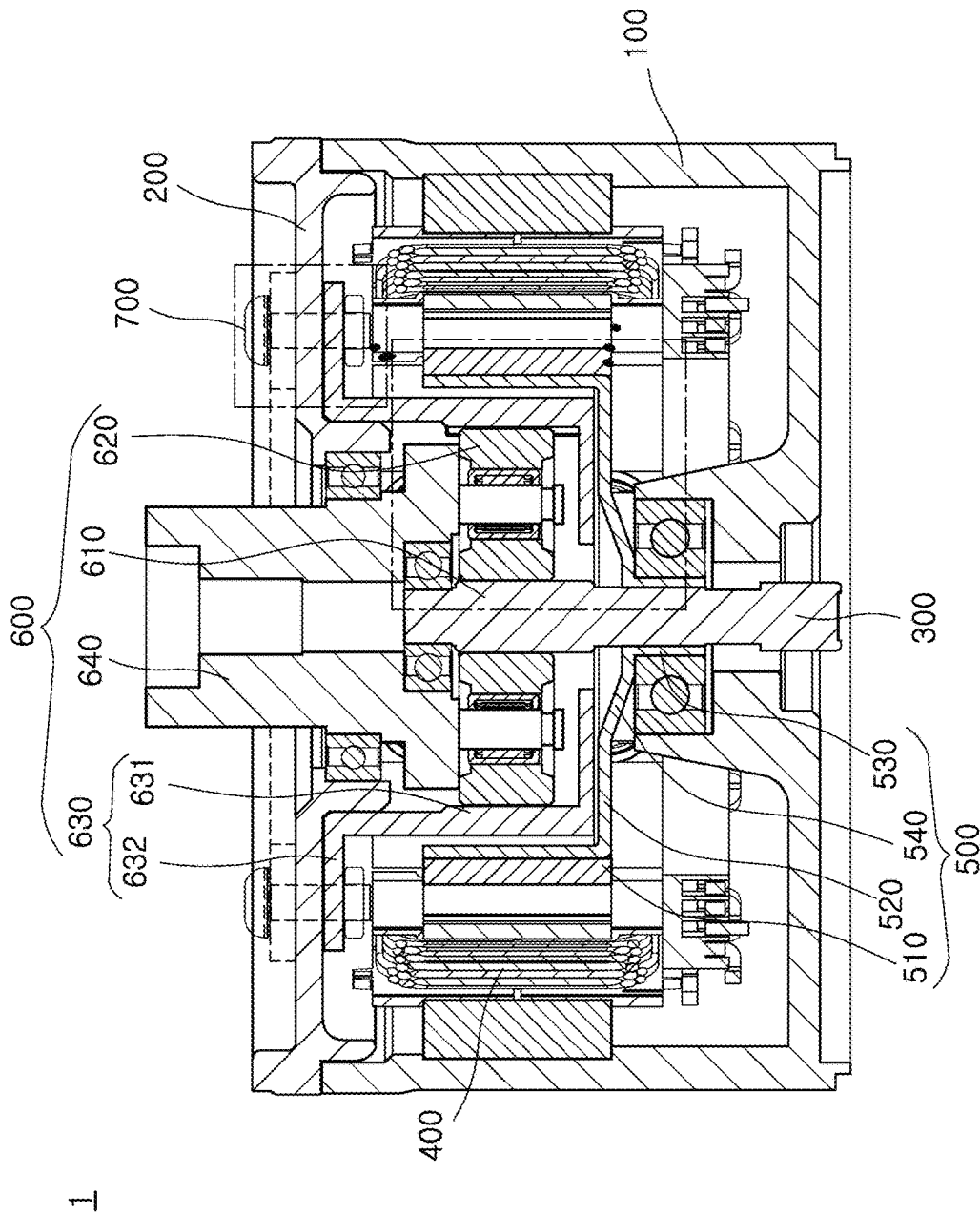
FIG. 3 is a cross-sectional view schematically illustrating the configuration of the steering reaction force generation device for a vehicle in accordance with the embodiment of the present disclosure.

FIG. 1 is a perspective view schematically illustrating the configuration of a steering reaction force generation device for a vehicle in accordance with an embodiment of the present disclosure, FIG. 2 is an exploded perspective view schematically illustrating the configuration of the steering reaction force generation device for a vehicle in accordance with the embodiment of the present disclosure, and FIG. 3 is a cross-sectional view schematically illustrating the configuration of the steering reaction force generation device for a vehicle in accordance with the embodiment of the present disclosure.

Referring to FIGS. 1 to 3, a steering reaction force generation device 1 for a vehicle in accordance with an embodiment of the present disclosure includes a housing 100, a cover part 200, a transfer shaft part 300, a stator part 400, a rotor part 500, a power transfer part 600, and a fastener 700.

The housing 100 forms the approximate exterior of the steering reaction force generation device 1 for a vehicle in accordance with the embodiment of the present disclosure. The housing 100 is formed in a hollow cylindrical shape, and provides a space in which the transfer shaft part 300, the stator part 400, the rotor part 500, the power transfer part 600, and the fastener 700 can be installed. The housing 100 has one open side through which the components installed therein can be easily managed and replaced. The specific shape of the housing 100 is not limited to that illustrated in FIGS. 1 to 3, but may be variously changed in design as long as the components of the steering reaction force generation device 1 for a vehicle in accordance with the embodiment of the present disclosure can be installed in the housing 100.

The cover part 200 is detachably coupled to the open side of the housing 100, and opens/closes the internal space of the housing 100. The cover part 200 in accordance with the embodiment of the present disclosure may be formed in the shape of a plate facing the open side of the housing 100. The cover part 200 may be press-fitted onto the inner circumferential surface of the housing 100, or detachably coupled to the housing 100 through bolting. The specific shape of the cover part 200 is not limited to that illustrated in FIGS. 1 to 3, but may be variously changed in design as long as the cover part 200 can selectively open/close the housing 100.

The transfer shaft part 300 is rotatably installed in the housing 100. The transfer shaft part 300 in accordance with the embodiment of the present disclosure is formed in the shape of a shaft, and installed in the housing 100. The transfer shaft part 300 is supported by a bearing or the like so as to rotate inside the housing 100. The central axis of the transfer shaft part 300 is disposed coaxially with a steering shaft (not illustrated) rotated by a steering wheel (not illustrated) of the vehicle. That is, the longitudinal direction of the transfer shaft part 300 is set in parallel to the longitudinal direction of the steering shaft.

The stator part 400 is fixed to the inside of the housing 100, and receives power from the outside and generates a magnetic field to rotate the rotor part 500 which will be described below. The stator part 400 in accordance with the embodiment of the present disclosure is formed in a hollow cylindrical shape, and installed in the housing 100. The stator part 400 is disposed in the housing 100 such that the inner circumferential surface thereof faces the outer circumferential surface of the transfer shaft part 300. The stator part 400 has the central axis disposed coaxially with the central axis of the transfer shaft part 300. The stator part 400 may be directly fixed to the inner circumferential surface of the housing 100 or fixed to the housing 100 by a separate fixing unit so as not to be rotated on the central axis thereof inside the housing 100. The stator part 400 may have a ring-shaped yoke and a plurality of teeth which protrude from the yoke toward the center of the stator part 400 such that a coil is wound around the teeth. The teeth may be arranged at predetermined intervals along the outer circumferential surface of the yoke. A stator core may be configured by stacking a plurality of thin steel plates, or configured by coupling or connecting a plurality of individual cores to one another.

The rotor part 500 is rotatably installed in the housing 100, and connected to the transfer shaft part 300. The rotor part 500 is rotated by an electromagnetic interaction with the stator part 400, and rotates the transfer shaft part 300.

The rotor part 500 in accordance with the embodiment of the present disclosure includes a rotor core 510, a seating part 520, a connection part 530, and a stress distribution part 540.

The rotor core 510 is formed in a hollow cylindrical shape, and installed in the housing 100. The rotor core 510 is disposed in the housing 100 such that the outer circumferential surface thereof faces the inner circumferential surface of the stator part 400, and the inner circumferential surface thereof faces the outer circumferential surface of the transfer shaft part 300. The rotor core 510 is installed so that the central axis thereof is disposed coaxially with the central axis of the transfer shaft part 300.

The rotor core 510 may have a plurality of magnets attached to the outer circumferential surface thereof. The plurality of magnets are arranged in the circumferential direction of the rotor core 510 so as to be spaced apart by a predetermined distance from each other. The plurality of magnets rotate the rotor core 510 on the central axis thereof in connection with an electromagnetic force caused by the magnetic field generated through the stator part 400.

The seating part 520 is fixed to the inner circumferential surface of the rotor core 510. The power transfer part 600 which will be described below is housed in the seating part 520. Thus, the seating part 520 may allow the power transfer part 600 to be located inside the housing 100, not outside the housing 100, which makes it possible to reduce the whole length of the steering reaction force generation device 1 for a vehicle in accordance with the embodiment of the present disclosure.

The seating part 520 in accordance with the embodiment of the present disclosure is formed in a substantially cylindrical shape, such that the outer circumferential surface thereof faces the inner circumferential surface of the rotor core 510. The outer circumferential surface of the seating part 520 is press-fitted onto the inner circumferential surface of the rotor core 510, or fixed to the rotor core 510 through bolting. Thus, when the rotor core 510 is rotated, the seating part 520 is rotated with the rotor core 510. The seating part 520 is formed in a hollow shape, and has one open side (top side in FIG. 3). Therefore, the power transfer part 600 may be smoothly inserted into or separated from the seating part 520. The seating part 520 is installed so that the central axis thereof is disposed coaxially with the central axis of the transfer shaft part 300. The diameter and height of the internal space of the seating part 520 can be changed in design to various values depending on the size of the power transfer part 600.

The connection part 530 is extended from the seating part 520, and connected to the transfer shaft part 300. The connection part 530 is rotated with the seating part 520 when the rotor core 510 is rotated, and transfers the rotational force of the rotor part 500 to the transfer shaft part 300. The connection part 530 in accordance with the embodiment of the present disclosure may be formed in a hollow cylindrical shape which is vertically extended from a closed side (bottom side in FIG. 3) of the seating part 520. The transfer shaft part 300 is inserted into the connection part 530. The inner circumferential surface of the connection part 530 may be press-fitted onto the outer circumferential surface of the transfer shaft part 300, or connected to the outer circumferential surface of the transfer shaft part 300 through spline teeth. Thus, the connection part 530 may rotate the transfer shaft part 300 in connection with the rotation of the rotor core 510. The outer circumferential surface of the connection part 530 may be connected to a bearing or the like, such that the connection part 530 can be supported rotatably in the housing 100.

The stress distribution part 540 is provided between the seating part 520 and the connection part 530 so as to distribute stress applied to the rotor part 500. The stress distribution part 540 in accordance with the embodiment of the present disclosure is disposed along the boundary between the seating part 520 and the connection part 530. The stress distribution part 540 may be formed in the shape of an inclined surface which is extended from the seating part 520 toward the connection part 530 while inclined at a predetermined angle. Thus, the stress distribution part 540 may prevent stress concentration which occurs at the boundary between the seating part 520 and the connection part 530, when the rotor part 500 is rotated.

The power transfer part 600 is installed inside the rotor part 500. The power transfer part 600 is connected to the transfer shaft part 300 and the steering shaft, and transfers the rotational force of the transfer shaft part 300 to the steering shaft, thereby generating a steering reaction force.

The power transfer part 600 in accordance with the embodiment of the present disclosure includes a sun gear part 610, a planetary gear part 620, a ring gear part 630, and a carrier part 640.

The sun gear part 610 is extended from the transfer shaft part 300, and disposed in the seating part 520. The sun gear part 610 in accordance with the embodiment of the present disclosure is extended from an end of the transfer shaft part 300 in the axial direction of the transfer shaft part 300. The sun gear part 610 has gear teeth formed on the outer circumferential surface thereof so as to be engaged with the planetary gear part 620 which will be described below. The sun gear part 610 is coupled to the transfer shaft part 300, and rotated with the transfer shaft part 300. The sun gear part 610 may be formed as one body with the transfer shaft part 300 when the transfer shaft part 300 is manufactured. Alternatively, the sun gear part 610 may be manufactured separately from the transfer shaft part 300, and connected to the transfer shaft part 300.

The ring gear part 630 is fixed to the inside of the housing 100, and spaced apart from the sun gear part 610. The ring gear part 630 in accordance with the embodiment of the present disclosure includes a ring gear 631 and a fixed part 632.

Figure 4:
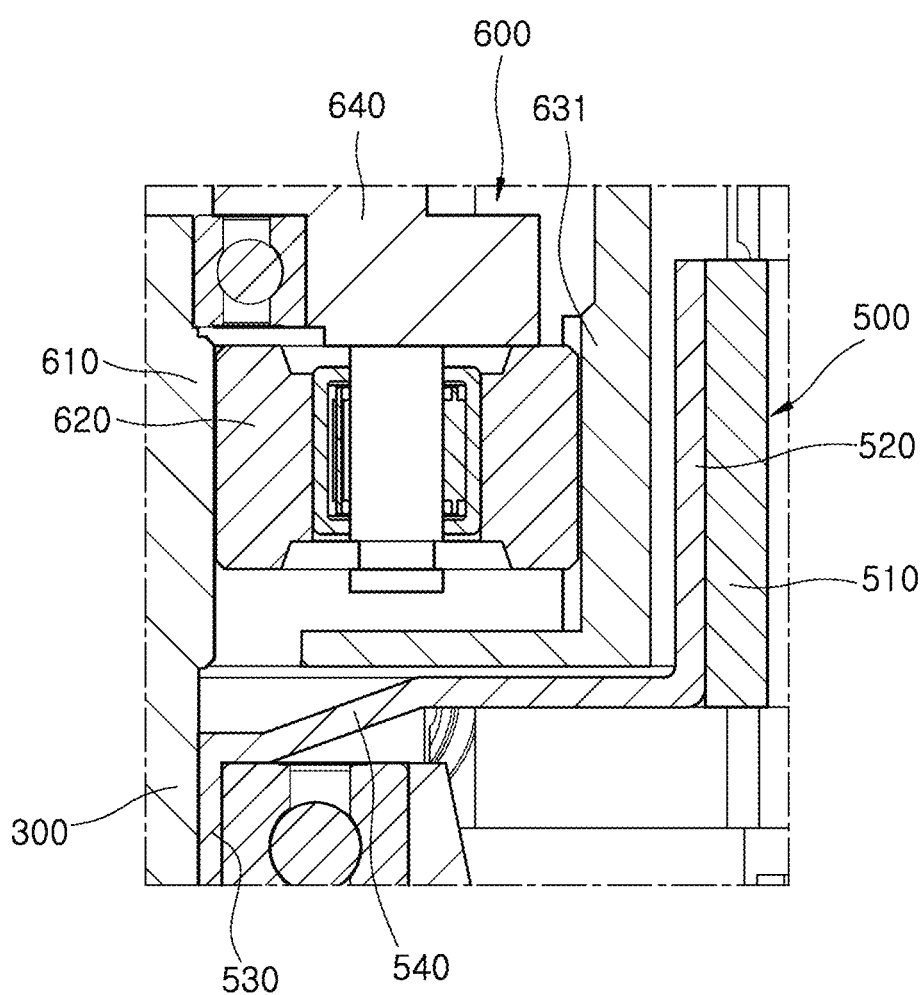
FIG. 4 is an expanded view schematically illustrating the configuration of a ring gear in accordance with the embodiment of the present disclosure.

FIG. 4 is an expanded view schematically illustrating the configuration of the ring gear in accordance with the embodiment of the present disclosure.

Referring to FIGS. 3 and 4, the ring gear 631 is formed in a substantially cylindrical shape, and disposed coaxially with the sun gear part 610. The ring gear 631 is installed in the seating part 520, such that the inner circumferential surface thereof is spaced apart by a predetermined distance from the outer circumferential surface of the sun gear part 610 while facing the outer circumferential surface of the sun gear part 610. The ring gear 631 has a plurality of gear teeth protruding from the inner circumferential surface thereof, and is engaged and coupled with the planetary gear part 620 which will be described below. The ring gear 631 is disposed so that the outer surface thereof is spaced apart by a predetermined distance from the inner surface of the seating part 520 while facing the inner surface of the seating part 520. Thus, the ring gear 631 may maintain the state in which the ring gear 631 is not rotated by interfering with the seating part 520, when the rotor part 500 is rotated.

Figure 5:
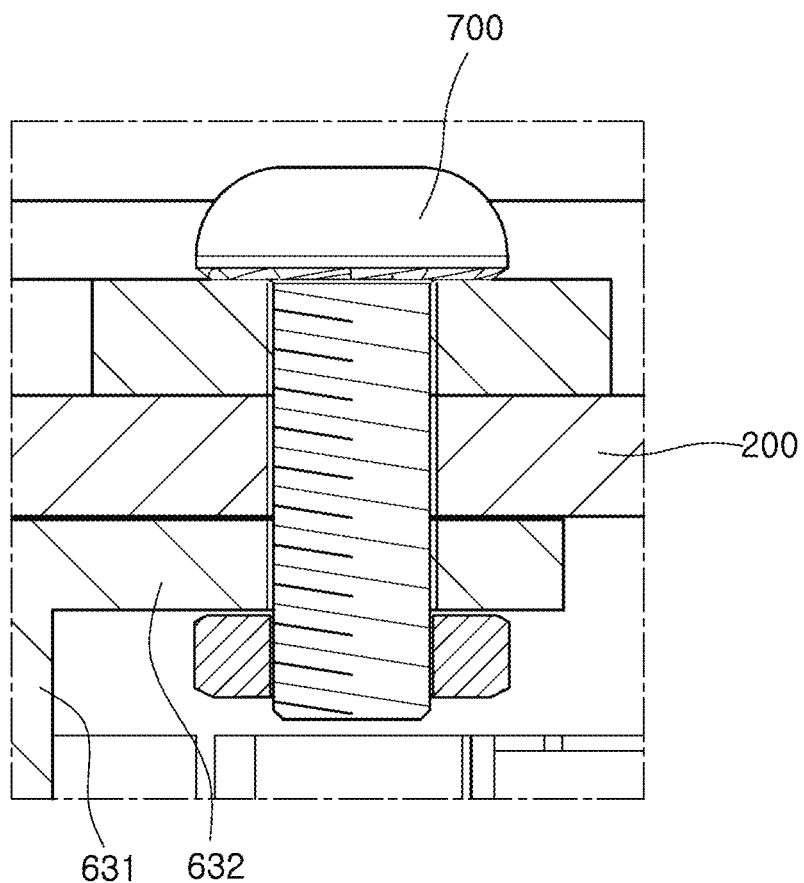
FIG. 5 is an expanded view schematically illustrating the configuration of a fixed part in accordance with the embodiment of the present disclosure.

FIG. 5 is an expanded view schematically illustrating the configuration of the fixed part in accordance with the embodiment of the present disclosure.

Referring to FIG. 5, the fixed part 632 in accordance with the embodiment of the present disclosure may be formed in the shape of a flange which is extended from the top of the ring gear 631 in the radial direction of the ring gear 631. In this case, the top surface of the fixed part 632 may be brought into contact with the bottom surface of the cover part 200, and the fixed part 632 may be detachably fixed to the cover part 200 by the fastener 700 exemplified as a bolt screw or the like. Thus, the fixed part 632 may support the ring gear part 630 such that the ring gear part 630 does not rotate inside the housing 100. However, the shape of the fixed part 632 is not limited to such a shape, but may be variously changed in design as long as the fixed part 632 can be extended in a direction parallel to the longitudinal direction of the ring gear 631 and directly assembled to the cover part 200 or detachably fixed to the cover part 200.

The planetary gear part 620 is provided between the sun gear part 610 and the ring gear part 630. The planetary gear part 620 in accordance with the embodiment of the present disclosure may be formed in a hollow cylindrical shape with gear teeth formed on the outer circumferential surface thereof. The planetary gear part 620 has a diameter corresponding to the distance between the sun gear part 610 and the ring gear 631. The planetary gear part 620 has both side surfaces engaged and coupled with the outer circumferential surface of the sun gear part 610 and the inner circumferential surface of the ring gear 631, respectively. The planetary gear part 620 may be inserted into one side of the carrier part 640 which will be described below, and supported so as to rotate on the central axis thereof. The planetary gear part 620 is provided as a plurality of planetary gear parts which are arranged at predetermined intervals in the circumferential direction of the sun gear part 610 and the ring gear part 630. The plurality of planetary gear parts 620 rotate the carrier part 640 to be described below, while rotating and revolving in connection with the rotational force of the sun gear part 610.

The carrier part 640 has one side connected to the steering shaft and the other side connected to the plurality of planetary gear parts 620. The carrier part 640 is rotated in connection with the revolutions of the plurality of planetary gear parts 620, and applies a steering reaction force to the steering shaft. The carrier part 640 in accordance with the embodiment of the present disclosure is rotatably installed in the housing 100. The carrier part 640 may be supported by a bearing or the like so as to rotate inside the housing 100. The carrier part 640 is installed so that the central axis thereof is disposed on the same line as the central axes of the transfer shaft part 300 and the steering shaft. One side (bottom side in FIG. 3) of the carrier part 640 is formed as a plurality of pillars which are arranged at predetermined intervals in the circumferential direction of the carrier part 640, and inserted into the respective planetary gear parts 620. Thus, the carrier part 640 may be rotated on the center axis thereof, as the plurality of planetary gear parts 620 are revolved. The other side (top side in FIG. 3) of the carrier part 640 protrudes to the outside of the housing 100 through the cover part 200. The other side of the carrier part 640 is press-fitted into the end of the steering shaft, or spline-coupled to the end of the steering shaft, thereby finally transferring the rotational force generated by the rotor part 500 to the steering shaft.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering reaction force generation device for a vehicle, comprising:
   a housing;
   a transfer shaft part rotatably installed in the housing, and disposed coaxially with a steering shaft;
   a stator part fixed to an inside of the housing;
   a rotor part connected to the transfer shaft part and being configured to rotate the transfer shaft part through an electromagnetic interaction with the stator part;
   a power transfer part installed in the rotor part and being configured to transfer a rotational force of the transfer shaft part to the steering shaft;
   wherein the rotor part comprises:
      a rotor core having an outer circumferential surface facing an inner circumferential surface of the stator part;
      a seating part fixed to an inner circumferential surface of the rotor core and having the power transfer part housed therein; and
      a connection part extended from the seating part and being connected to the transfer shaft part; and
   wherein the connection part has an inner circumferential surface press-fitted onto an outer circumferential surface of the transfer shaft part.

2. The steering reaction force generation device of claim 1, wherein the seating part has an outer circumferential surface press-fitted onto the inner circumferential surface of the rotor core.

3. The steering reaction force generation device of claim 1, wherein the seating part is coupled to the rotor core through bolting.

4. The steering reaction force generation device of claim 1, wherein the rotor part further comprises a stress distribution part between the seating part and the connection part and being configured to distribute stress applied to the rotor part.

5. The steering reaction force generation device of claim 4, wherein the stress distribution part is extended from the seating part toward the connection part and inclined at a predetermined angle.

6. The steering reaction force generation device of claim 1, wherein the power transfer part comprises:
   a sun gear part extending from the transfer shaft part and being disposed in the seating part;
   a ring gear part fixed to the inside of the housing and being spaced apart from the sun gear part;
   a plurality of planetary gear parts provided between the sun gear part and the ring gear part and being configured to rotate and revolve in connection with a rotational force of the sun gear part; and
   a carrier part connected to the steering shaft and configured to be rotated in connection with revolutions of the plurality of planetary gear parts.

7. The steering reaction force generation device of claim 6, wherein the ring gear part comprises:
   a ring gear disposed coaxially with the sun gear part and having an inner circumferential surface engaged with the plurality of planetary gear parts; and
   a fixed part extended from the ring gear and being detachably fixed to a cover part for opening/closing the housing.

8. The steering reaction force generation device of claim 7, wherein the ring gear is disposed so that an outer surface thereof is spaced apart by a predetermined distance from an inner surface of the seating part and facing the inner surface of the seating part.

9. The steering reaction force generation device of claim 7, wherein the fixed part extends from a top of the ring gear in a radial direction of the ring gear and has a top surface brought into contact with a bottom surface of the cover part.

10. A steering reaction force generation device for a vehicle, comprising:
a housing;
a transfer shaft part rotatably installed in the housing, and disposed coaxially with a steering shaft;
a stator part fixed to an inside of the housing;
a rotor part connected to the transfer shaft part and being configured to rotate the transfer shaft part through an electromagnetic interaction with the stator part;
a power transfer part installed in the rotor part and being configured to transfer a rotational force of the transfer shaft part to the steering shaft;
wherein the rotor part comprises:
a rotor core having an outer circumferential surface facing an inner circumferential surface of the stator part;
a seating part fixed to an inner circumferential surface of the rotor core and having the power transfer part housed therein; and
a connection part extended from the seating part and being connected to the transfer shaft part; and
wherein the seating part is coupled to the rotor core through bolting.

11. The steering reaction force generation device of claim 10, wherein the rotor part further comprises a stress distribution part between the seating part and the connection part and being configured to distribute stress applied to the rotor part.

12. The steering reaction force generation device of claim 10, wherein the power transfer part comprises:
a sun gear part extending from the transfer shaft part and being disposed in the seating part;
a ring gear part fixed to the inside of the housing and being spaced apart from the sun gear part;
a plurality of planetary gear parts provided between the sun gear part and the ring gear part and being configured to rotate and revolve in connection with a rotational force of the sun gear part; and
a carrier part connected to the steering shaft and configured to be rotated in connection with revolutions of the plurality of planetary gear parts.

13. A steering reaction force generation device for a vehicle, comprising:
a housing;
a transfer shaft part rotatably installed in the housing, and disposed coaxially with a steering shaft;
a stator part fixed to an inside of the housing;
a rotor part connected to the transfer shaft part and being configured to rotate the transfer shaft part through an electromagnetic interaction with the stator part;
a power transfer part installed in the rotor part and being configured to transfer a rotational force of the transfer shaft part to the steering shaft;
wherein the rotor part comprises:
a rotor core having an outer circumferential surface facing an inner circumferential surface of the stator part;
a seating part fixed to an inner circumferential surface of the rotor core and having the power transfer part housed therein; and
a connection part extended from the seating part and being connected to the transfer shaft part; and
wherein the connection part has an inner circumferential surface connected to an outer circumferential surface of the transfer shaft part through spline teeth.

14. The steering reaction force generation device of claim 13, wherein the rotor part further comprises a stress distribution part between the seating part and the connection part and being configured to distribute stress applied to the rotor part.

15. The steering reaction force generation device of claim 13, wherein the power transfer part comprises:
a sun gear part extending from the transfer shaft part and being disposed in the seating part;
a ring gear part fixed to the inside of the housing and being spaced apart from the sun gear part;
a plurality of planetary gear parts provided between the sun gear part and the ring gear part and being configured to rotate and revolve in connection with a rotational force of the sun gear part; and
a carrier part connected to the steering shaft and configured to be rotated in connection with revolutions of the plurality of planetary gear parts.

\* \* \* \* \*